(12) United States Patent
Vining et al.

(10) Patent No.: US 10,875,613 B2
(45) Date of Patent: Dec. 29, 2020

(54) MOTORIZED AQUATIC ANIMAL DETERRENT

(71) Applicants: Tyler Vining, Evans, GA (US); Robert Rife, Mt. Pleasant, SC (US)

(72) Inventors: Tyler Vining, Evans, GA (US); Robert Rife, Mt. Pleasant, SC (US)

( * ) Notice: Subject to any disclaimer, the term of this patent is extended or adjusted under 35 U.S.C. 154(b) by 91 days.

(21) Appl. No.: 16/180,182

(22) Filed: Nov. 5, 2018

(65) Prior Publication Data

US 2019/0135394 A1 May 9, 2019

Related U.S. Application Data

(60) Provisional application No. 62/581,831, filed on Nov. 6, 2017.

(51) Int. Cl.
| | |
|---|---|
| B63G 8/28 | (2006.01) |
| B63G 8/00 | (2006.01) |
| A01M 29/24 | (2011.01) |
| A01M 29/06 | (2011.01) |
| A01M 29/16 | (2011.01) |
| G05D 1/02 | (2020.01) |
| G05D 1/00 | (2006.01) |
| A01K 79/02 | (2006.01) |
| B63G 13/00 | (2006.01) |

(52) U.S. Cl.
CPC .............. *B63G 8/001* (2013.01); *A01K 79/02* (2013.01); *A01M 29/06* (2013.01); *A01M 29/16* (2013.01); *A01M 29/24* (2013.01); *B63G 8/28* (2013.01); *B63G 13/00* (2013.01); *G05D 1/0088* (2013.01); *G05D 1/0206* (2013.01); *B63G 2008/004* (2013.01); *B63G 2008/007* (2013.01)

(58) Field of Classification Search
CPC ....... A01K 79/02; A01M 29/06; A01M 29/16; A01M 29/24; B63G 8/001; B63G 8/28; B63G 8/00

See application file for complete search history.

(56) References Cited

U.S. PATENT DOCUMENTS

| | | | |
|---|---|---|---|
| 7,145,835 B2 | 12/2006 | Pope | |
| 8,290,636 B2 | 10/2012 | Manning | |
| 10,537,095 B2 * | 1/2020 | Harrick | A01K 79/02 |
| 2008/0300742 A1 * | 12/2008 | Weaver | B63C 11/40 |
| | | | 701/21 |
| 2011/0290190 A1 | 12/2011 | Becker | |
| 2015/0183498 A1 * | 7/2015 | Wardle | B63G 8/38 |
| | | | 114/337 |

* cited by examiner

*Primary Examiner* — Stephen P Avila
(74) *Attorney, Agent, or Firm* — B. Craig Killough; Riley Pope & Laney

(57) ABSTRACT

A motorized, floating device is associated with another aquatic device that carries a passenger or passengers ("associated aquatic device"). The invention comprises components such as one or more magnetic field emitters that deter aquatic animals from approaching the associated aquatic device without interfering with the operation of the associated aquatic device. The associated aquatic device may be a surfboard, a raft, a personal watercraft, or other similar small craft that floats in water. The invention may be used with larger boats and other watercraft. The motorized aquatic animal deterrent is tethered to the associated aquatic device to follow movement of the associated aquatic device but is spaced apart from the associated aquatic device.

14 Claims, 4 Drawing Sheets

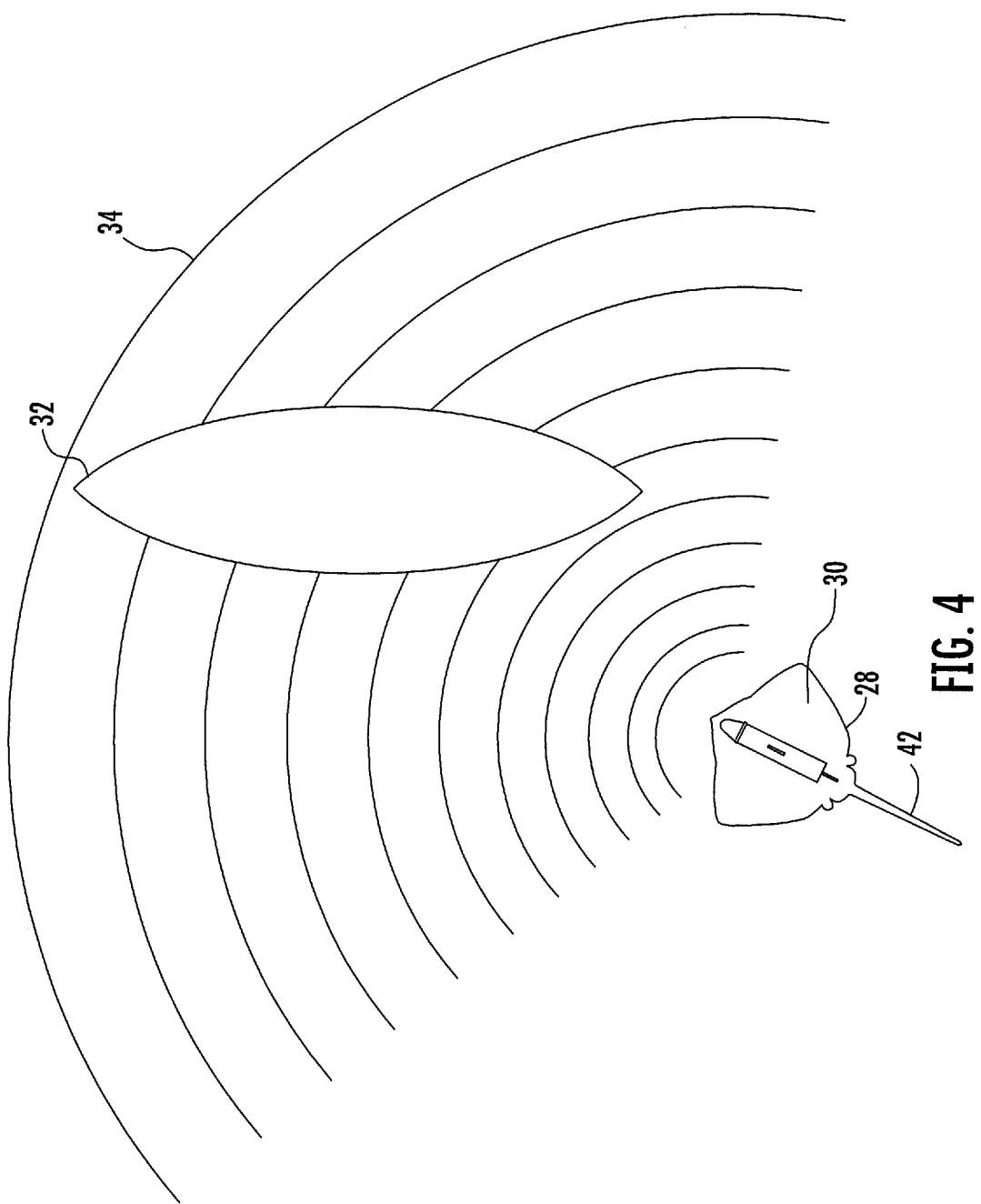

MOTORIZED AQUATIC ANIMAL DETERRENT

This Application claims the benefit of Provisional Patent Application Ser. No. 62/581,831, filed Nov. 6, 2017.

BACKGROUND OF THE INVENTION

People enjoy activities that take place in the ocean. Such activities include swimming, paddle boarding, kayaking and surfing. There is a danger of attack from aquatic animals, and most notably, sharks. There is a need for a device that reduces the likelihood of attack from such animals but does not interfere with the water activity.

SUMMARY OF THE INVENTION

This invention is a motorized, floating device that is associated with another aquatic device that carries a passenger or passengers ("associated aquatic device"). The invention comprises components such as one or more magnetic field emitters that deter aquatic animals from approaching the associated aquatic device without interfering with the operation of the associated aquatic device. The associated aquatic device may be a surfboard, a raft, a personal watercraft, or other similar small craft that floats in water. The invention may be used with larger boats and other watercraft.

The invention is tethered to the associated aquatic device. The motorized aquatic animal deterrent follows movement of the associated aquatic device but is spaced apart from the associated aquatic device.

BRIEF DRAWING DESCRIPTION

FIG. 4 demonstrates a magnetic field emitted by the motorized aquatic animal deterrent to the associated aquatic device.

DESCRIPTION OF PREFERRED EMBODIMENTS

Figure 1:
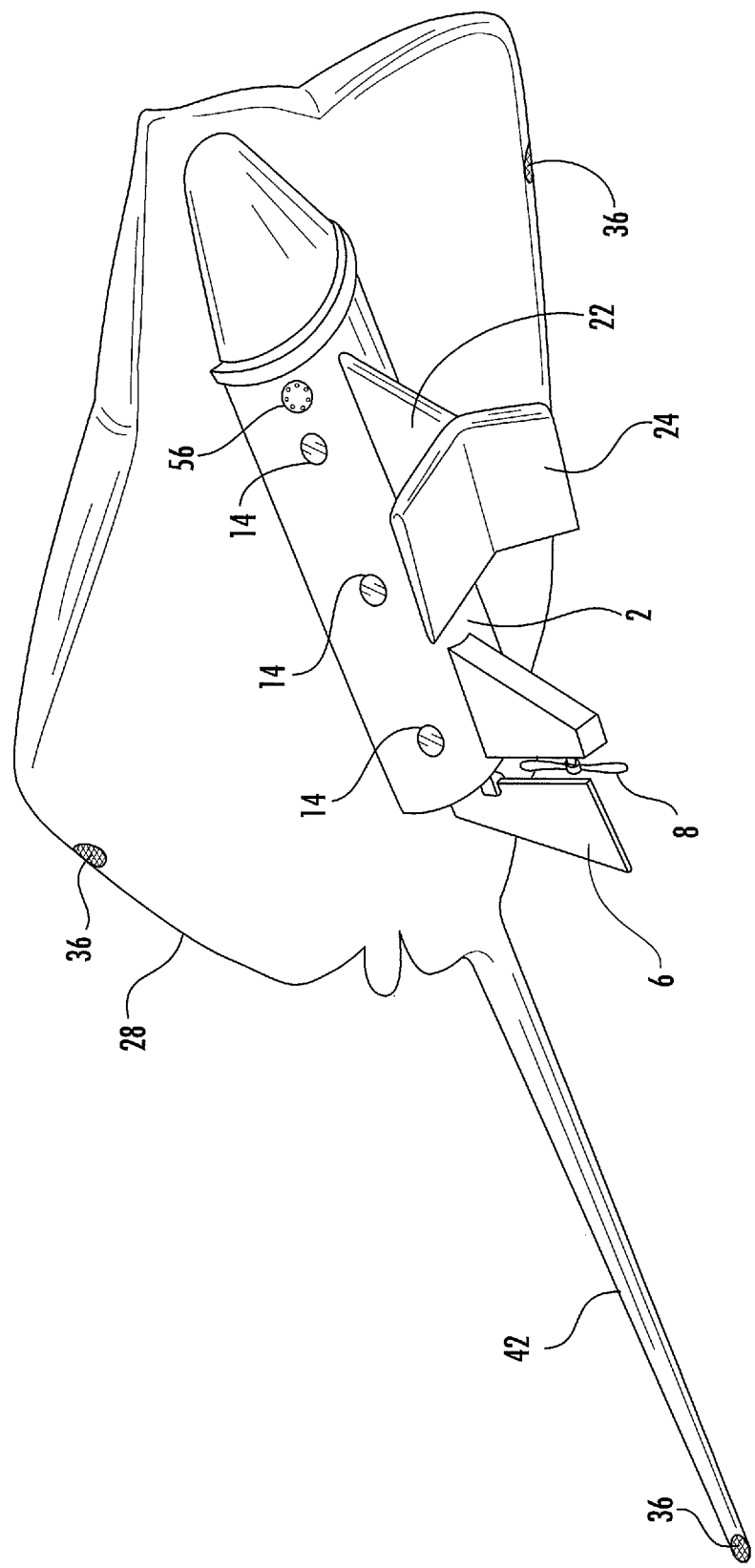
FIG. 1 is a perspective view of an embodiment of the motorized aquatic animal deterrent viewed from a bottom of the device.

As shown in FIG. 1, the motorized aquatic animal deterrent comprises a housing 2. The configuration of the housing may be varied. The housing 2 is preferred to be substantially transparent to electromagnetic emission. The shape of the housing is preferred to be hydrodynamically efficient thereby facilitating movement through the water with a minimum of water resistance.

In the embodiment shown in FIG. 1, the housing 2 is a tube having a rounded or pointed end. The housing in this embodiment is preferred to be formed as a unitary member to the degree possible according to the requirements of the invention so as to reduce joints or openings that may allow water intrusion. An end is of the housing may engage a cap 4 on the housing. The cap allows access to internal components as required for service or replacement. The housing may be formed in other shapes. In one embodiment a threaded cap that is water tight is used with the housing. The housing and its internal components have a combined specific gravity that is sufficiently low to float in water.

In one embodiment, a body 28 overlays the housing and is fixed to the housing 2, preferably in a manner that provides for easy removal and replacement. The body is preferred to have a specific gravity that is sufficiently low to float in water, but which is also impact resistant. The body and the housing may be formed of lightweight plastics such as PVC or high-density polyethylene, or perhaps ABS. The body may be formed in desired shapes that are preferably hydrodynamically efficient so as to reduce the amount of propulsion required to move the device through the water. As shown in the drawings, and as an example, the body when viewed from the top has the general shape of a stingray, and the tail may serve as an antenna 42 for the GPS or radio frequency (RF) transmitter receiver.

Figure 2:
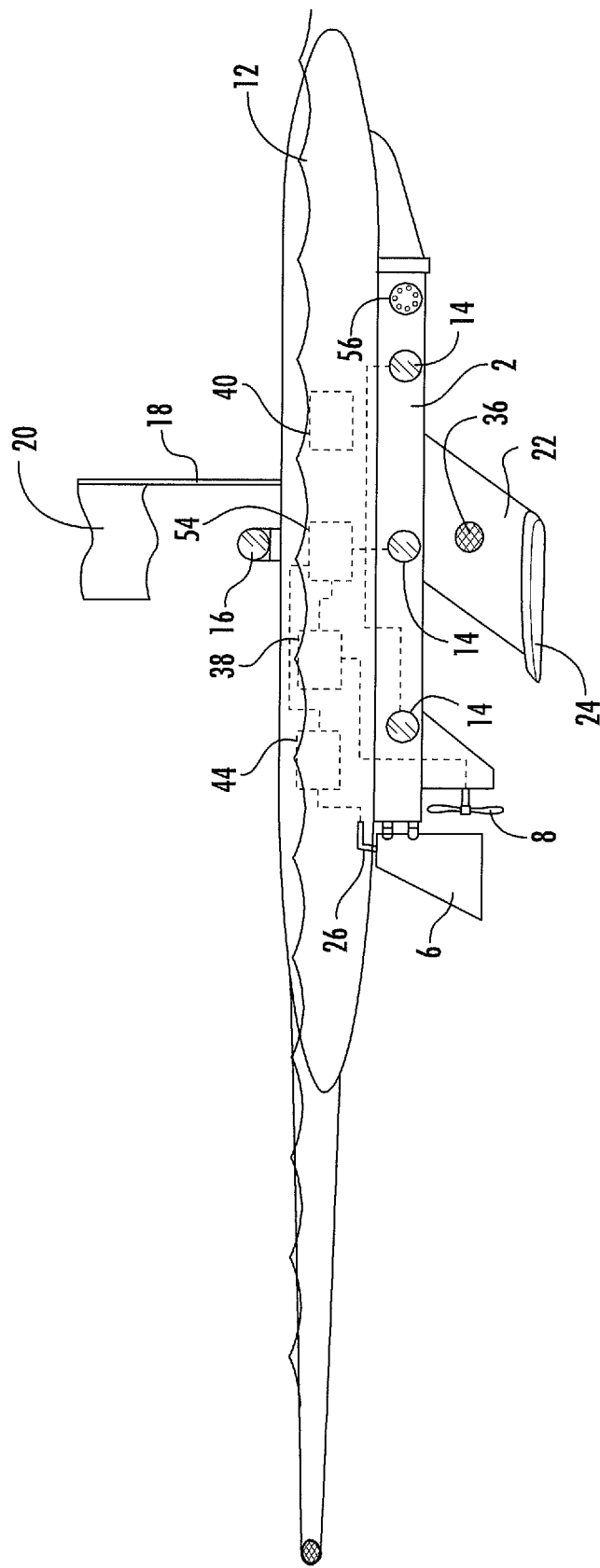
FIG. 2 is a side elevation of the motorized aquatic animal deterrent of FIG. 1.
Figure 3:
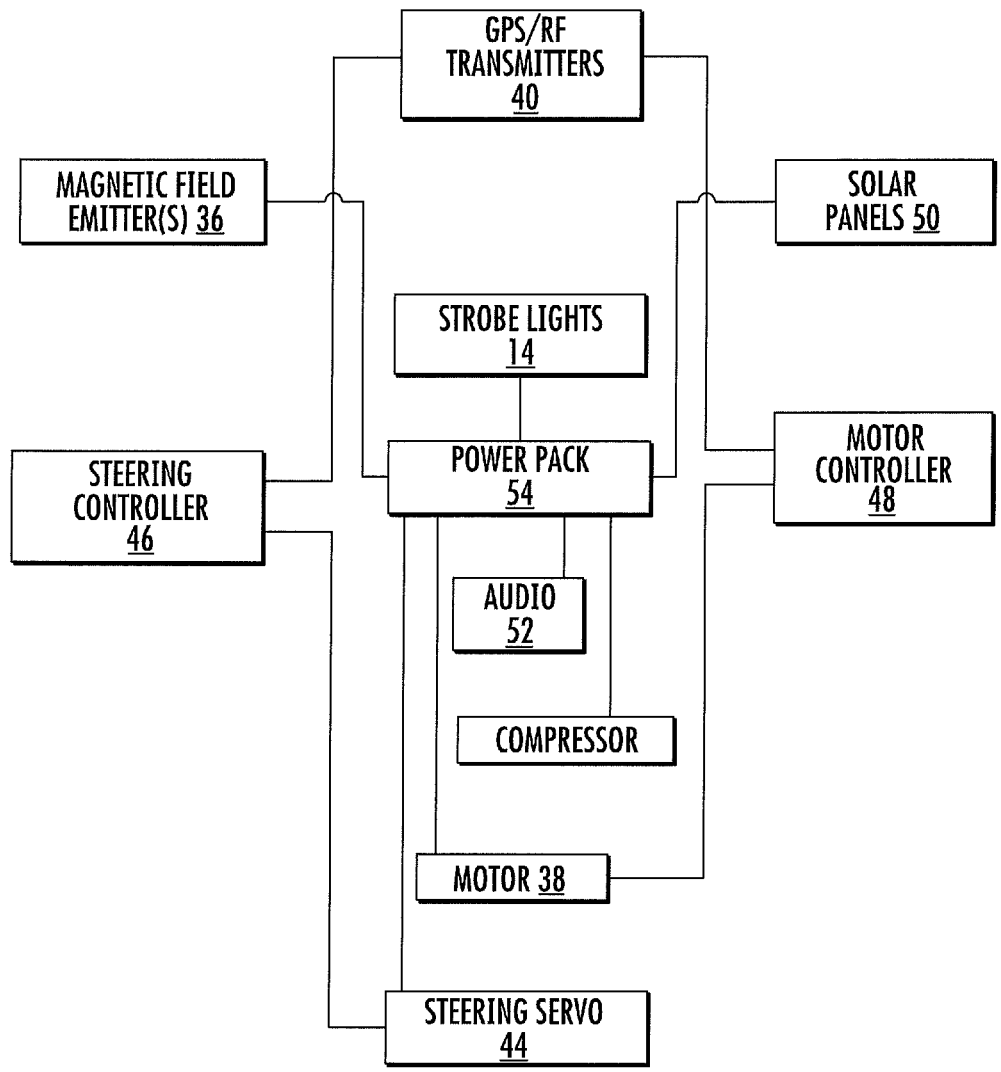
FIG. 3 is schematic diagram indicating operational components of the motorized aquatic animal deterrent.

A magnetic field emitter 36 emits a magnetic field 34 from the device. Magnetic fields will repel sharks and other aquatic animals. By way of example, multiple magnetic field emitters may be positioned on the device. As shown in FIG. 1 and FIG. 2, a magnetic field emitter may be positioned on each side of the keel 22, on each side of the body 28, and at the tail of the body. The magnetic field emitted by the magnetic field emitter is sufficient to radiate the magnetic field at an efficacious strength to repel aquatic animals. The optimal number of magnetic field emitters and positioning may be determined by empirical observation so that the associated aquatic device is maintained within the efficacious magnetic field. By way of example and not limitation, the motorized aquatic animal deterrent 30 is tethered to a surfboard 32 and follows the surfboard. The efficacious magnetic field 34 surrounds the surfboard, deterring sharks and other aquatic mammals from coming approaching the surfboard. FIG. 4. In one embodiment, the magnetic field may be directed or focused toward the associated aquatic device rather than extending radially from the motorized aquatic animal deterrent.

Alternatively, or additionally, an electronic pulse emitter may be employed that emits electronic pulses from the housing at a frequency that deters aquatic animals in the area surrounding the associated aquatic device. Alternatively, or additionally, an emitter that provides an acoustic deterrent 52 may be employed.

The motorized aquatic animal deterrent comprises a propulsion device. Contained in the housing 2 may be an electric motor 38 for providing propulsion. The electric motor actuates the propeller 8 of the motorized aquatic animal deterrent to propel the motorized aquatic animal deterrent through the water. The size of the motor and the propeller is dependent upon the required speed of the motorized aquatic animal deterrent. For example, the required speed and torque of the motor and speed of the propeller may be higher for a wind surfer than for an inflatable raft that is powered by rowing.

The motorized aquatic animal deterrent comprises guidance control for steering the device. The guidance control may comprise a rudder 6. The rudder may be connected, for example, by an actuator arm 26 that is moved by a servo 44 contained within the housing. The servo may be actuated by a signal received from a guidance device or position locator. A location signal may be transmitted from the associated aquatic device 32. The location signal may be generated by known position location devices, such as radio frequency (RF) or global positioning system (GPS) 40 devices A position location signal receiver associated with the motorized aquatic animal deterrent may communicate with a processor that communicates with the servo to move the rudder as required to keep the motorized aquatic animal deterrent tethered to the associated aquatic device.

In one embodiment, a radio signal is emitted from the associated aquatic device 32 and received by a receiver associated with the housing 2. The receiver measures the signal strength and direction to determine the distance from the transmitter and ensures that the motorized aquatic animal deterrent stays within a defined distance from the associated aquatic device so that the magnetic field emitted from the motorized aquatic animal deterrent is efficacious for the associated aquatic device. The receiver may communicate with a propulsion speed controller, which may be a motor speed controller 48. The propulsion speed controller may be the receiver combined with a processor that governs, for example, the motor speed of the electric motor 38. In combination with movement of the steering servo 44 by the steering controller, speed and direction of the motorized aquatic animal deterrent 30 is controlled.

In another embodiment, a GPS tracking system 46 associated with the motorized aquatic animal deterrent 30 acts as a position locator and tracks the location of the associated aquatic device. The GPS tracking system may communicate with the guidance control, such as steering controller 46, which may be a receiver and processor that controls steering servo 44. In combination with the propulsion or motor controller 48 the motorized aquatic animal deterrent is controlled to stay within a predetermined distance from the associated aquatic device so that the magnetic field is efficacious.

In another embodiment, a cellular telephone system-based position locator allows the motorized aquatic animal deterrent 30 to determine the location of the associated aquatic device 32 and maintain a distance that is sufficient for the magnetic field emitted around the associated aquatic device is efficacious in deterring aquatic animals from approaching the associated aquatic device. The steering controller 46 and motor controller 48 may be used in the cellular telephone-based position locator embodiment.

Other tracking and locating devices and systems may be used. The term "tethered" as used herein is not a physical tether. The distance maintained by the tracking or locating system between the motorized aquatic animal deterrent 30 and the associated aquatic device 32 is sufficient to provide an efficacious magnetic field for the associated aquatic device. A sufficient distance is maintained between the motorized aquatic animal deterrent and the associated aquatic device so that the motorized aquatic animal deterrent does not interfere with normal operation of the associated aquatic device, such as a surfboard.

In an embodiment, multiple strobe lights 14 that are positioned below the water surface 12 are associated with the housing 2. The strobe lights deter animals from approaching the motorized aquatic animal deterrent and the associated aquatic device. One or more lights, which may be strobe lights 16, may be affixed to the housing and above the water line to provide visibility to keep boats and other human powered objects from striking the motorized aquatic animal deterrent.

As shown in FIG. 2, and in an embodiment, a mast 18 extends above the motorized aquatic animal deterrent. The mast may act as an antenna for receiving radio and satellite signals and may be used in place of or in addition to the antenna 42. Other visibility enhancing devices may be attached to the mast, including a brightly colored flag 20, or a device that reflects signals, such as a radar reflector that improves radar visibility of the device.

In one embodiment, a radio frequency transmitter and/or GPS position locator is attached to a human, such a swimmer, who in such an application is the associated aquatic device. The radio frequency transmitter and/or GPS position locator is worn by the user of the associated aquatic device. For example, if the user, such as a surfer, is separated from the surfboard, the electromagnetic field will surround and protect the user.

In another embodiment, rather than using a propeller 8, a motor powers an impeller. Water may be directed through the housing by the impeller and expelled from an exhaust so as to provide propulsion.

A keel 22 may be provided. The keel extends generally along a centerline of the housing and extends downwardly as a blade to increase stability and provide ballast for the housing. The keel keeps the housing properly oriented in the water for proper steering and propulsion. The keel positions the strobe lights 14 below the water surface in an embodiment. The keel may be a wing keel 24 that provides ballast while minimizing the depth of water required for operation to a few centimeters in some applications.

The top surface of the motorized aquatic animal deterrent may be positioned above the water line in use. The amount of free board, if any, of the motorized aquatic animal deterrent will depend on the flotation characteristics of particular embodiments of the motorized aquatic animal deterrent, given the size of the housing and the mass of the housing and the remaining components. In another embodiment, the housing 2 is submerged.

In another embodiment, a solar panel or panels 50 are provided on a top surface of the motorized aquatic animal deterrent to assist in providing a charge to batteries 54. Batteries, such as rechargeable batteries, are contained within the housing to power electrical components, such as the magnetic field emitters 36, the strobe lights 14 and any other lighting used, the propulsion device, and the steering device, such as a servo motor.

In yet another embodiment, a bubble diffuser 56, such as those used with aquariums, is provided. The emission of bubbles is believed to act as a deterrent of potentially harmful or dangerous aquatic animals.

What is claimed is:

1. A motorized aquatic animal deterrent, comprising:
 a housing, the housing comprising propulsion, a guidance control, a propulsion speed controller, a position locator, a magnetic field emitter that broadcasts a magnetic field around a spaced apart and associated aquatic device to which the motorized aquatic animal deterrent is tethered, wherein, in use, the position locator communicates with the guidance control and the motor speed control to tether the motorized aquatic animal deterrent to the associated aquatic device and maintain the associated aquatic device within the magnetic field broadcast by the magnetic field emitter.

2. A motorized aquatic animal deterrent as described in claim 1, further comprising an emitter that emits an acoustic deterrent to an area surrounding the associated aquatic device.

3. A motorized aquatic animal deterrent as described in claim 1, further comprising an electronic pulse emitter that emits electronic pulses at a frequency that deters aquatic animals to an area surrounding the associated aquatic device.

4. A motorized aquatic animal deterrent as described in claim 1, wherein the position locator is a global positioning system that identifies a location of the associated aquatic device and communicates with the guidance control and the motor speed control to tether the motorized aquatic animal deterrent to the associated aquatic device and maintain the associated aquatic device within the magnetic field broadcast by the magnetic field emitter.

5. A motorized aquatic animal deterrent as described in claim 1, wherein the position locator comprises a radio frequency receiver that receives a radio signal from the associated aquatic device and communicates with the guidance control and the motor speed control to tether the motorized aquatic animal deterrent to the associated aquatic device and maintain the associated aquatic device within the magnetic field broadcast by the magnetic field emitter.

6. A motorized aquatic animal deterrent as described in claim 1, comprising a plurality of magnetic field emitters that collectively broadcast a magnetic field around a spaced apart and associated aquatic device to which the motorized aquatic animal deterrent is tethered.

7. A motorized aquatic animal deterrent as described in claim 1, further comprising a strobe light positioned below a water line of the motorized aquatic animal deterrent.

8. A motorized aquatic animal deterrent as described in claim 1, further comprising a bubble diffuser.

9. A motorized aquatic animal deterrent as described in claim 1, further comprising a keel that extends below the housing.

10. A motorized aquatic animal deterrent as described in claim 1, further comprising a body that covers a top surface of the housing.

11. A motorized aquatic animal deterrent as described in claim 1, wherein the position locator receives a signal from the associated aquatic device and identifies a location of the associated aquatic device from the signal and the position locator communicates with the guidance control and the motor speed control to tether the motorized aquatic animal deterrent to the associated aquatic device and maintain the associated aquatic device within the magnetic field broadcast by the magnetic field emitter.

12. A motorized aquatic animal deterrent as described in claim 1, wherein the as described in claim 11, wherein the position locator is not attached to the associated aquatic device.

13. A motorized aquatic animal deterrent as described in claim 1, wherein the motorized aquatic animal deterrent floats on a surface of a body of water.

14. A motorized aquatic animal deterrent as described in claim 1, wherein the housing is substantially transparent to electromagnetic transmission.

* * * * *